United States Patent Office 3,184,496
Patented May 18, 1965

3,184,496
PROCESS FOR THE PREPARATION AND RECOVERY OF TRIETHYL PHOSPHITE AND DERIVATIVES THEREOF
Charles F. Baranauckas, Niagara Falls, Russell L. K. Carr, Grand Island, and James J. Hodan, Tonawanda, N.Y., assignors to Hooker Chemical Corporation, Niagara Falls, N.Y., a corporation of New York
No Drawing. Filed Feb. 27, 1961, Ser. No. 91,664
35 Claims. (Cl. 260—461)

This invention relates to an improved method of preparing and recovering triethyl phosphite and to the preparation of derivatives of triethyl phosphite.

Numerous processes have been developed for the preparation of trialkyl phosphites such as triethyl phosphite. In one process phosphorus trichloride is reacted with ethanol in the presence of hydrogen chloride acceptors such as ammonia or amines. Numerous problems arise in preparing triethyl phosphite by this technique. For example, the reaction is highly exothermic, and expensive cooling means must therefore be employed to control the reaction temperature. In addition, the reaction product is a mixture of triethyl phosphite and a hydrogen chloride salt, which must be treated by expensive purification techniques in order to obtain a relatively pure triethyl phosphite product. In addition, when amines are used as hydrogen chloride acceptors, the resulting trialkyl phosphite product has an odor due to nitrogen-containing by-products, which is undesirable and difficult to remove.

More recently trialkyl phosphites have been prepared by the transesterification of triaryl phosphites, such as triphenyl phosphite, with an alkyl alcohol in the presence of a basic catalyst. This technique is very effective in preparing tertiary alkyl phosphites from higher alkyl alcohols such as decyl alcohol. Since there is a marked difference in the boiling point of the reaction products tridecyl phosphite and phenol, separation of the phenol from the phosphite is readily attained. However, when this technique is applied to some of the lower alkyl alcohols, such as ethanol, the separation of the trialkyl phosphite, such as triethyl phosphite, from the other reaction products is not easily obtained. In the case of triethyl phosphite, for example, when the concentration of free ethanol is negligible, relatively large amounts of by-products are formed in the reaction mixture due to the partial or complete back-transesterification of triethyl phosphite by phenols in the reaction mixture. As a result, a relatively low conversion of phosphorus in the triaryl phosphite to triethyl phosphite is obtained, and separation of triethyl phosphite from the reaction mixture is difficult and costly.

That triethyl phosphite can be generated by a number of different chemical transformations under neutral, basic or acidic conditions is well documented in the prior art. Until the discovery of the present invention one of the major unsolved problems with respect to triethyl phosphite has been how to provide an economical and readily effective means of recovering triethyl phosphite from reaction mixtures in high yields and in a high state of purity.

It is an object of the present invention to provide an improved method of preparing and recovering triethyl phosphite.

A further object of the invention is to provide an improved method of recovering triethyl phosphite from reaction mixtures in high efficiency with respect to phosphorus values.

A further object of the invention is to provide an improved method of recovering triethyl phosphite from the reaction products of ethanol and either triaryl phosphite, or diaryl ethyl phosphite, or aryl diethyl phosphite, and/or mixtures thereof in the presence of a basic catalyst.

Still another object of the invention is to provide a method of separating an ethanol-triethyl phosphite mixture substantially free of phenols from the reaction mixture produced by transesterifying either triaryl phosphite or diarylethyl phosphite or aryl diethyl phosphite and/or mixtures thereof with ethanol in the presence of a basic catalyst.

Still another object of the invention is to provide an improved method of separating an ethanol-triethyl phosphite mixture from the reaction mixture of phosphorus trichloride, ethanol and hydrogen chloride acceptor.

Another object of the invention is to provide an improved method of preparing triethyl phosphate.

It is another object of the invention to provide an improved method of preparing triethyl phosphorothionate.

A further object of the invention is to provide an improved method of preparing triethyl phosphoroselenonoate.

Another object of the invention is to provide an improved method of preparing trialkyl and trialkenyl phosphites.

Another object of the invention is to provide an improved method of preparing triallyl phosphite.

Another object of the invention is to provide an improved method of preparing trimethallyl phosphite.

A further object of the invention is to provide an improved method of preparing isomers of triethyl phosphite.

It is a further object of the invention to provide a method of preparing dialkyl hydrogen phosphites of high purity.

Still another object of the invention is to provide an improved method of preparing dialkyl hydrogen phosphites concomitantly with alkyl halides of high purity.

A further object of the invention is to provide an improved process for preparing diethyl hydrogen phosphite and ethyl chloride.

It is another object of the invention to provide an improved process for preparing diethyl hydrogen phosphite and ethyl bromide.

Another object of the invention is to provide an improved process for preparing diethyl hydrogen phosphite and ethyl iodide.

It is a further object of the invention to provide an improved method of preparing dibutyl hydrogen phosphite and butyl chloride.

Still another object of the invention is to provide an improved process for preparing dibutyl hydrogen phosphite and butyl bromide.

Another object of the invention is to provide an improved process for preparing diallyl hydrogen phosphite and allyl chloride.

Still another object of the invention is to provide an improved process for preparing dialkenyl hydrogen phosphites and alkenyl halides.

Another object of the invention is to provide an improved process for preparing dimethallyl hydrogen phosphite and methallyl bromide.

Another object of the invention is to provide an improved process for preparing diisopropyl hydrogen phosphite and isopropyl chloride.

Still a further object of the invention is to provide an improved process for preparing dicyclohexyl hydrogen phosphite and cyclohexyl bromide.

A further object of the invention is to provide an improved method for preparing trialkyl and trialkenyl phosphates.

It is another object of the invention to provide an improved process for preparing trialkyl and trialkenyl phosphorothionates.

Still another object of the invention is to provide an improved process for preparing trialkyl and trialkenyl phosphoroselenonoates.

Also an object of the invention is to provide an improved process for preparing dialkyl alkylphosphonates.

Another object of the invention is to provide a process for the preparation of diethyl ethylphosphonate.

Still a further object of the invention is to provide an improved process for preparing diethyl alkenylphosphonates.

Still another object of the invention is to provide an improved process for preparing tetraethyl alkylene-bis-phosphonates.

A further object of the invention is to provide an improved process for preparing tetraalkenyl alkylene-bis-phosphonates.

A still further object of the invention is to provide an improved process for preparing organic phosphates having utility as insecticides and/or intermediates for insecticides.

A further object of the invention is to provide an improved process for preparing O,O-diethyl-O-(2,4,5-trichlorophenyl)phosphorothioate.

A further object of the invention is to provide an improved process for preparing O,O-diethyl-O-(3-chloro-4-nitrophenyl)phosphorothioate.

A further object of the invention is to provide an improved process for preparing O,O-diethyl-1-hydroxy-2,2,2-trichloroethylphosphonate.

A further object of the invention is to provide an improved process for preparing O,O-diethyl-O-(2-isopropyl-4-methylpyrimid-6-yl)-thiophosphate.

A still further object of the invention is to provide an improved process for preparing triallyl phosphate.

A still further object of the invention is to provide an improved process for preparing trimethallkyl phosphate.

A still further object of the invention is to provide an improved process for preparing O,O - diethyl(p - nitrophenyl)phosphorothioate.

These and other objects of the invention will be apparent from the following detailed description.

The present invention has been found to be effective in the separation of triethyl phosphite in high yield and purity from the recation mixtures used to prepare triethyl phosphite, regardless of whether these mixtures are acidic, basic or neutral.

One convenient method for preparing a reaction mixture of triethyl phosphite is by transesterifying an aryl-substituted phosphite selected from the group consisting of aryl diethyl phosphites, diaryl ethyl phosphites, triaryl phosphites and mixtures thereof, with ethanol in the presence of a basic catalyst, distilling the reaction mixture in the presence of sufficient ethanol to prevent back-transesterification of the triethyl phosphite and to permit co-distillation of ethanol and all of the triethyl phosphite from the reaction mixture, while maintaining additional ethanol in the distillation residue. The gaseous ethanol-triethyl phosphite mixture produced by the aforesaid distillation technique is substantially free from phenols. Triethyl phosphite may be readily separated in high purity from this mixture either with or without the use of an ethanol azeotrope-former. The triethyl phosphite residue obtained in the distillation generally has a purity greater than about ninety-five percent, and the yield, based upon the phosphorus content of the aryl-substituted phosphite, is generally quantitative. The above defined technique for separating triethyl phosphite from phenols can also be applied to transesterification mixtures that have been generated under either neutral conditions or under conditions of acidic catalysis, but is described in detail hereinafter with respect to the base catalyzed reaction for purposes of illustration. In addition to producing triethyl phosphite, various derivatives of triethyl phosphite can be prepared from the mixture of ethanol and triethyl phosphite, the mixture of ethanol-azeotrope-former and triethyl phosphite, and the substantially pure triethyl phosphite product, as described more fully hereinafter.

Any triaryl phosphite capable of being transesterified with ethanol to yield triethyl phosphite can be employed. Typical examples of triaryl phosphites include triphenyl phosphite, tricresyl phosphite, tris(2,4-xylenyl) phosphite, tris(butylphenyl) phosphite, and other tris(alkylated aryl) phosphites, tris(o-chlorophenyl) phosphite, and tris(m-chlorophenyl) phosphite. In addition, unsymmetrical triaryl phosphites can be used such as phenyl dicresyl phosphite, diphenyl cresyl phosphite, phenyl cresyl-o-chlorophenyl phosphite, dicresyl nonylphenyl phosphite and the like and mixtures thereof.

Any diaryl ethyl phosphite capable of being transesterified with ethanol to yield triethyl phosphite can be employed. Typical examples of suitable diaryl ethyl phosphites include diphenyl ethyl phosphite, phenyl cresyl ethyl phosphite, dicresyl ethyl phosphite, di(butylphenyl) ethyl phosphite, di(nonylphenyl) ethyl phosphite, di(o-chlorophenyl) ethyl phosphite, di(2,4-xylenyl) ethyl phosphite and other di(alkylaryl) ethyl phosphites, di(chlorophenyl) ethyl phosphites, bis(dichlorophenyl) ethyl phosphites, bis(trichlorophenyl) ethyl phosphite, cresyl nonylpenyl ethyl phosphite, o-chlorophenyl phenyl ethyl phosphite and mixtures thereof.

Any aryl diethyl phosphite capable of being transesterified with ethanol to yield triethyl phosphite can be employed. Typical examples of suitable aryl diethyl phosphites include phenyl diethyl phosphite, cresyl diethyl phosphite, xylenyl diethyl phosphite, (butylphenyl) diethyl phosphite, (octylphenyl) diethyl phosphite, (nonylphenyl) diethyl phosphite, (chlorophenyl) diethyl phosphite, (dichlorophenyl) diethyl phosphite, (trichlorophenyl) diethyl phosphite and mixtures thereof.

In addition, mixtures containing triaryl phosphites diaryl ethyl phosphites and aryl diethyl phosphites can be used.

The catalyst should be a strong enough base to have a pH of greater than seven in an 0.1 normal solution. Typical examples are sodium, potassium, lithium, sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium ethylate, potassium ethylate, sodium cetylates, sodium octadecylates, diethyl aniline, quinoline, monododecyl monomethyl amine, pyridine, monododecyl dimethyl amine, etc.

Instead of employing a pre-formed alcoholate, the alcoholate can be formed in situ by adding the metal, e.g., sodium, potassium or lithium to the ethanol prior to adding to the aryl-substituted phosphite. If desired, the metal may be added directly to the reaction mixture. The basic catalyst is used in distinctly catalytic amounts, e.g., between about 0.001 and about 0.2 mol, and preferably between about 0.01 and about 0.05 mole per mole of the aryl-substituted phosphite. However, greater or lesser proportions may be employed if desired.

Any compound capable of forming an azeotrope with ethanol in the presence of triethyl phosphite that does not react with the phosphite under the operating conditions described more fully below, may be employed. Suitable azeotrope-forming compounds include cyclohexane, benzene, toluene, acetronitrile, ethyl nitrate, methyl borate, thiophene, methylcyclohexane, cyclopentane, n-octane, methylcyclopentane, hexanes, octanes, 2,2,4-trimethylpentane, dipropyl ether methylcyclopentene and any other compound capable of forming an azetrope with ethanol that does not react with triethyl phosphite under the reaction conditions employed.

At least three basic techniques may be employed to effect the improved results of this invention. These techniques are referred to hereinafter as (1) the batch technique, (2) the recycle technique and (3) the continuous technique. Each technique is capable of numerous modifications of detail without departing from the fundamental concept of the technique.

(1) BATCH TECHNIQUE

In the batch technique ethanol and an aryl-substituted phosphite are added to the reaction vessel in a proportion sufficient to provide a stoichiometric excess of ethanol necessary to form triethyl phosphite, for example, at least about one percent stoichiometric excess and preferably between about five and about one hundred percent stoichiometric excess of ethanol. A further excess of ethanol is added to serve as a codistilling agent for triethyl phosphite after completion of the reaction, and to provide at least some ethanol in the phenol-containing residue after completion of distillation. The proportion of ethanol necessary to serve as a codistilling agent will vary with the type of product desired. For example, when the weight ratio of ethanol to triethyl phosphite (not accounting for the proportion of ethanol to form triethyl phosphite), is about ten to one, the concentration of triethyl phosphite in the ethanol-triethyl phosphite distillate is relatively low. If a higher concentration of triethyl phosphite is desired, without regard to degree of conversion, a relatively low weight ratio of ethanol to triethyl phosphite may be employed.

The basic catalyst is added in the above-defined proportions to the ethanol and aryl-substituted phosphite, and the reactants are then heated to a temperature preferably between about eighty and about two hundred degrees centigrade. Temperatures below eighty degrees centigrade may be employed; for example, the reaction may be carried out at room temperature or lower. Temperatures above about two hundred degrees centigrade may be employed, but at these higher temperatures there is danger of thermally induced by-product reactions occurring, particularly when extended reaction periods are employed. The reaction may be carried out at any convenient pressure, for example, at subatmospheric pressure, at atmospheric pressure, or at superatmospheric pressure. The reaction and separation periods will depend upon the temperature and pressure conditions employed, as well as the proportion of excess ethanol and the concentration of catalyst in the reaction mixture. The reaction mixture is distilled while simultaneously adding to the distillation pot sufficient ethanol to prevent back-transesterification of the triethyl phosphite, and the ethanol addition is continued until substantially all of the triethyl phosphite is distilled from the reaction mixture. The resulting distillate, which is a mixture of ethanol and triethyl phosphite may be condensed and collected for further processing, as described more fully below. For example, this mixture may be subjected to distillation with or without an azeotrope-former to yield a liquid phase of substantially pure triethyl phosphite.

(2) RECYCLE TECHNIQUE

In the recycle technique an aryl-substituted phosphite and ethanol are added to a reaction vessel provided with a distillation column and a heating means for the reaction vessel. Means are provided for conveying the gases from the top of the distillation column to a condenser and the resulting condensate is conveyed by suitable piping means to the product vessel. The product vessel is also provided with a distillation column and heating means, suitable piping means being provided for conveying the gases from the top of the distillation column of the product vessel to a condenser and then back to the reaction vessel.

A number of ways exist in which a recycle system such as the one described here can be started and operated. For example, it is possible to charge the aryl-substituted phosphite, the catalyst and ethanol to the reaction vessel, and to the product vessel individually. It is possible to charge the aryl-substituted phosphite and the catalyst to the reaction vessel together or charge the ethanol and catalyst into the reaction vessel together. In addition, it is possible to charge the aryl-substituted phosphite and catalyst to the reaction vessel and charge all the ethanol, i.e., that needed for reaction as well as that needed for codistillation, into the product vessel and then charge the reaction vessel with the ethanol by distilling ethanol from the product vessel to the reaction vessel. In addition, it makes little difference in the separation efficiency of the ethanol as to whether it is added below the surface of the contents of the reaction vessel or to the surface of the contents of the reaction vessel when it is added as a liquid. As a means of more efficient heating of the reaction vessel, the ethanol can be vaporized and introduced under the surface of the contents of the reaction vessel as a gas and under such circumstances, there is a profound difference in this operation from the introduction of ethanol vapors into the vapor space of the reaction vessel.

At start up, when a triaryl phosphate, ethanol and the basic catalyst are charged to the reaction vessel, the proportion of ethanol is equivalent to about three moles per mole of triaryl phosphate, and the basic catalyst is added in a proportion between about 0.001 and 0.2 mole per mole of the triaryl phosphite under normal operations. Additional ethanol and a small proportion of the basic catalyst are added to the product vessel.

The reactants in the reaction vessel are heated to incipient boiling up to a maximum of about two hundred degrees centigrade at which time the transesterification reaction is sufficiently complete to permit the co-distillation process to begin. At this time the separation phase of the process involving the co-distillation of ethanol and triethyl phosphite from the reaction vessel is begun by distilling the ethanol from the product vessel up the column to the condenser and then returning the condensate to the reaction vessel where the ethanol co-distills with the triethyl phosphite. This gaseous stream of ethanol and triethyl phosphite from the top of the distillation column of the reaction vessel is condensed and conveyed to the product vessel. The contents of the product vessel are maintained at a boiling temperature, which generally is between about seventy-eight and about one hundred and fifty-five degrees centigrade at atmospheric pressure. The boiling temperature of the product vessel contents or body is dependent upon the concentration of ethanol and triethyl phosphite present in the vessel. This temperature changes during the course of the separation as more triethyl phosphite accumulates in the product vessel as the separation process progresses. Ethanol is recycled to the reaction vessel to repeat the cycle and this is continued until substantially all of the available triethyl phosphite is removed from the reaction vessel to the product vessel. The contents remaining in the reaction vessel are then stripped of dissolved ethanol, and phenolic substance. The remainder is left in the reaction vessel and a second charge is added to this material. This residue may contain from about ten percent up to about twenty percent of the phosphorus originally charged.

The material in the product vessel is then further distilled to remove the ethanol and leave the triethyl phosphite as a residue product having assay values in the range of about ninety-two to about ninety-eight percent triethyl phosphite. In addition, the triethyl phosphite residue can be further distilled and, contingent upon the purity required, triethyl phosphite having assay values of about ninety-five to about ninety-nine percent can be readily attained.

Ethanol recovered from the product vessel is returned to the product vessel for the next run. The procedure is then repeated by adding additional triaryl phosphite, ethanol and catalyst to the reaction vessel and make-up ethanol to the product vessel. Dependent upon size of vessels, and other operating conditions, it is possible to make several charges to the reaction vessel while holding the triethyl phosphite from several runs in the product vessel before making a final concentration or distillation. When vessel sizes are adequate, triaryl phosphite can be added to the reaction vessel as a top charge while the separation of the triethyl phosphite is in progress from an earlier charge thus permitting concomitant transesterification and separation in the recycle technique. Although the description of the recycle technique has dealt with operation under essentially atmospheric conditions, the operation can be conducted under either superatmospheric or subatmospheric pressure as well, and this would change some of the temperature relationships but not the basic concept of the invention.

If desired, an ethanol-azeotrope-former may be added to the reaction vessel with the aryl-substituted phosphite, ethanol and catalyst, and/or may be added to the product flask with ethanol at start up. During the reaction and separation, the azeotrope-former and ethanol are vaporized in the product vessel, conveyed to the reaction vessel, and then co-distilled with triethyl phosphite from the reaction vessel. When an ethanol-azetrope-former is employed in this manner, codistillation of ethanol and triethyl phosphite from the product vessel is minimized and requires a less efficient fractionation column on the product vessel.

The triethyl phosphite produced in accordance with this technique can be processed with other chemicals as an ethanol-azeotrope-former solution, as a concentrated residue product or as a purified distilled product as defined more fully below.

When more ethanol is present in the product vessel than can be removed with the azeotrope-former, then a concentrated triethyl phosphite solution in ethanol is obtained as a residue product, and this is desirable for some future chemical processing steps.

On the other hand, when more than enough azeotrope-former is present to remove the ethanol then a concentrated triethyl phosphite solution in the azeotrope-former is obtained as a residue product and this is desirable as a reactant stream of triethyl phosphite where the presence of free ethanol is undesirable.

Other modifications of details are possible and are contemplated and the disclosures are helpful in definition only and not limiting to the specific mode of operation as described below.

(3) CONTINUOUS TECHNIQUE

There are numerous variations that can be employed to permit the continuous transesterification of aryl-substituted phosphites, (triaryl phosphites, diaryl ethyl phosphites, aryl diethyl phosphites and mixtures thereof) with ethanol and the continuous co-distillation of an ethanol-triethyl phosphite mixture. These variations embody the basic concepts of the instant invention which is described in respect to a specific type of continuous technique for illustrative purposes and not for purposes of limitation.

An apparatus employed in one of the embodiments of the continuous technique is comprised of the following. A transesterification vessel equipped with suitable means for charging the aryl-substituted phosphite, ethanol and basic catalyst either individually or in admixture. This vessel also is equipped with suitable heating means, agitation means, and piping for the contnuous outflow of the transesterified mixture to a co-distillation vessel. The co-distillation vessel is equipped with suitable heating means, piping means for a continuous outflow of non-volatiles, a fractionation column equipped with a condenser and a fraction splitter to permit partial flow of the condensate to the top of the column as a reflux and the remainder to flow via suitable piping means to the collection vessel for the condensed volatiles from the co-distillation vessel.

The aforementioned apparatus is the basic skeletal equipment required for an embodiment of the instant invention which will be described as to operation conditions hereinafter.

The aryl-substituted phosphite, ethanol and the basic catalyst are fed to the transesterification vessel maintained at about eighty degrees centigrade to about two hundred degrees centigrade under atmospheric conditions. The proportion of ethanol in the feed is equivalent to that proportion necessary to transesterify the aryl-substituted phosphite to triethyl phosphite and an additional amount of ethanol to give a weight ratio of ethanol to triethyl phosphite of from about 0.2 to one to about two hundred and fifty to one. In order to obtain greater than about ninety-five percent recovery of triethyl phosphite, the preferred weight ratios of ethanol to triethyl phosphite are between about two to one and about one hundred to one, contingent upon the temperature in the co-distillation vessel. The residence time in the transesterification vessel is long enough to permit sufficient transesterification to occur prior to feeding the mixture to the co-distillation vessel and is generally from about five minutes to one hundred and twenty minutes at temperatures of about two hundred degrees centigrade and of about room temperature, respectively.

The transesterified mixture is then fed continuously to the co-distillation vessel maintained at a temperature in the range between about eighty degrees centigrade to about two hundred degrees centigrade. Temperatures below eighty degrees centigrade can be used under about atmospheric pressure, but are less efficient in the utilization of the ethanol as a co-distillation agent and are less efficient in obtaining optimum productive capacity per unit volume of the co-distillation vessel. Temperatures above about two hundred degrees are particularly conducive to undesired chemical side-reactions.

When the transesterified mixture enters the co-distillation vessel either as an above the surface feed or an under the surface feed, a mixture of ethanol and triethyl phosphite is vaporized and passes up the fractionation column to the condenser where it is condensed. A portion of the condensate is passed from a fraction splitter to the top of the fractionation column to serve as a reflux to sequester the carry-over of phenolic substances to the condensate stream. The other condensate stream from the fraction splitter is conducted via suitable piping means to the collection vessel.

The condensate in the collection vessel which is a solution of triethyl phosphite in ethanol can be reacted continuously with chemical reagents such as sulfur to form triethyl phosphorothionate while continuously stripping ethanol and returning it to the ethanol feed stream of the transesterification vessel.

Under the conditions when a concentrated triethyl phosphite is desired, the condensate from the collection vessel is then fed to a continuous fractionation column wherein the ethanol passes overhead and is condensed. The condensate is recycled to the appropriate stream. The concentrated triethyl phosphite passes down the column and is collected as a bottoms product for use in future chemical reactions. Alternatively, the concentrated stream of triethyl phosphite is subjected to batch fractionation to obtain distilled triethyl phosphite or is fed to suitable continuous fractionation colums to obtain distilled triethyl phosphite. Triethyl phosphite produced via the continuous co-distillation separation technique, followed by removal of ethanol by distillation and a subsequent batch fractionation yields triethyl phosphite as a distilled product that assays ninety-five to ninety-nine percent pure. If desired, an ethanol-azeotrope-former may be employed in a manner similar to that described above with respect to the recycle technique.

The liquid outflow from the co-distillation vessel is conducted to a continuous fractionation column held under reduced pressure. The column separates all volatiles up to the boiling point of the phenol present, and once separated, they are recycled to the transesterification vessel.

The remaining non-volatiles are passed to a second continuous distillation apparatus, wherein the phenols are recovered and returned to the aryl-substituted phosphite plant. The residue from this distillation is recycled to the transesterification vessel except for a small effluent stream that is removed to prevent the build up of salts and by-products.

This embodiment can be modified wherein the co-distillation vessel may function both as the transesterification vessel and the co-distillation vessel. In addition, the point at which the transesterification mixture enters can vary, as for example, at some point in the fractionation column, at the top of the co-distillation vessel, or in fact under the liquid surface of the co-distillation vessel, or even through the bottom of the co-distillation vessel. Furthermore, the means used to remove the overflow from the co-distillation vessel is not critical but must be consistent with sound engineering practice and economical operation of the plant.

In some instances, some of the recycle streams both of the condensate and the outflow from the co-distillation vessel may be filtered or treated in other ways to remove undesirable impurities or to recover economic values from by-products.

The transesterification and the co-distillation steps of the continuous technique can be carried out readily under conditions of subatmospheric or superatmospheric pressure as well as atmospheric pressure.

In accordance with the instant invention including the above described batch technique, recycle technique, and continuous technique, ethanol functions not only as a reactant to transesterify the aryl-substituted phosphite but also as a co-distilling agent for the efficient removal of the triethyl phosphite from the transesterified mixture. Therefore, sufficient ethanol should be present during distillation to serve both purposes.

During the course of the transesterification reaction and the co-distillation separation, it is necessary to provide ethanol as a reactant equal in moles to the moles of the aryl-substituted phosphite in order to obtain maximum yields of triethyl phosphite.

In instances where the aryl-substituted phosphite contains only one aryl substituent, co-distillation of ethanol and triethyl phosphite can actually begin before one mole of ethanol has reacted with the aryl-substituted phosphite. However, in order to obtain the high yields ultimately during the transesterification and co-distillation one mole of ethanol must react with the aryl-substituted phosphite. Similar results are obtained in cases where the aryl-substituted phosphites contain two and three aryl substituents and the proportion of ethanol is increased accordingly.

With sufficient phosphorus present as triethyl phosphite after the reaction it is necessary to retain it in this form until the triethyl phosphite is separated from the phenols present. This can be accomplished by maintaining an excess of ethanol in the transesterified mixture while codistilling a mixture of ethanol and triethyl phosphite therefrom. When distilling under atmospheric pressure the concentration of free ethanol in the transesterified mixture will be controlled by the temperature at which the co-distillation process is conducted and the type of aryl phosphite used as starting material. At a given temperature the mole percent excess of ethanol relative to the phosphorus content in the transesterified mixture will change as the mole fraction of triethyl phosphite in the mixture diminishes as it co-distills out with ethanol. Some ethanol will dissolve in the transesterification mixture to contribute a greater partial vapor pressure to compensate for the loss in partial pressure previously contributed by the triethyl phosphite.

The proportion of ethanol that is used as a co-distilling agent to promote the effective separation of the triethyl phosphite from the phenols (in order to permit the isolation of highly purified triethyl phosphite without the attendant problems of back-transesterification when phenols are present), must be sufficient to remove the triethyl phosphite under the distillation conditions employed. However, the excess should not be so great that subsequent separation of triethyl phosphite from the ethanol solution is an economic liability.

The weight ratio of ethanol to triethyl phosphite necessary to effect the separation of the available triethyl phosphite from the transesterification mixture will vary with the temperature, pressure, and the type of aryl-substituted phosphite. When triphenyl phosphite is employed as the aryl-substituted phosphite, and distillation is effected at atmospheric pressure and a temperature between about one hundred and twenty and about one hundred and thirty degrees centigrade, an average weight ratio of ethanol to triethyl phosphite of about eighty to one is required during co-distillation to recover about eighty percent of the triethyl phosphite. During the initial phases of the separation process, in the batch and recycle techniques, the weight ratio of ethanol to triethyl phosphite in the co-distillate may be as low as about five to one and when the triethyl phosphite in the transesterified mixture is nearly depleted, the weight ratio may be as high as about three hundred to one, with an average ratio during the separation step of about eighty to one. When phenyldiethyl phosphite is employed as the aryl-substituted phosphite under the same co-distillation conditions, the average ethanol to triethyl phosphite ratio required is about forty to one, and may range from between about eight to one to about 225:1 as co-distillation progresses in the batch and recycle techniques. The corresponding weight ratios necessary when diphenylethyl phosphite is employed are intermediate between those necessary for triphenyl phosphite and phenyldiethyl phosphite.

Under atmospheric conditions the separation of triethyl phosphite from the transesterified mixture can be effected at temperatures from about eighty degrees centigrade to about two hundred degrees centigrade using an ethanol to triethyl phosphite average weight ratio from about two hundred and fifty to one down to as low as about 0.2 to one.

The actual practical mode of operation depends to a large extent upon the ultimate use that the triethyl phosphite is to be put and the ultimate need for quality products from reacting triethyl phosphite alone or in solution with other chemical reagents.

In addition to the above described co-distillation technique, such separation techniques as liquid-thermal diffusion, gaseous thermal diffusion, liquid-liquid extraction, and selective adsorption can be used to effect separation of triethyl phosphite. It is recognized that these separation techniques are applicable to the batch, recycle and continuous techniques with proper modifications to fit their operating procedures.

The substantially pure triethyl phosphite product, the distilled triethyl phosphite product, the mixture of triethyl phosphite and ethanol, the mixture of triethyl phosphite, ethanol and ethanol azeotrope-former, the mixture of the triethyl phosphite and the ethanol azeotrope-former and mixtures thereof may be further processed to yield derivatives of triethyl phosphite. For example, the triethyl phosphite may be reacted with sulfur to yield triethyl phosphorothionate; with selenium to yield triethyl phosphoroselenonoate; with ethyl bromide, ethyl iodide, etc., to yield concomitantly diethyl ethylphosphonate and diethyl hydrogen phosphite; with hydrogen chloride, hydrogen bromide and hydrogen iodide to yield diethyl hydrogen phosphite and a relatively pure stream of the corresponding ethyl halide; with alkyl and alkenyl alcohols under basic catalysis to yield monoethyl dialkyl phosphites, diethyl alkyl phosphites, trialkyl phosphites, monoethyl dialkenyl phosphites, diethyl alkenyl phosphites, and trialkenyl phosphites; with oxygen and oxygen-containing gas mixtures and catalysts to yield triethyl phosphate; with alkylene oxides to yield triethyl phosphate; with nitrogen oxides to yield triethyl phosphate; with peroxides to yield triethyl phosphate; with alkylene dibromide to yield the corresponding tetraethyl alkylene bisphosphonates as well as other reactions derived from the products developed. These and other reactions are discussed in more detail below.

(1) REACTION WITH SULFUR

The mixture of triethyl phosphite and ethanol produced in the batch technique may be reacted with sulfur to yield triethyl phosphorothionate. This reaction may be effected by any one of several techniques. The physical state of the sulfur is not critical except that it should be relatively easily dispersed in the mixture by conventional agitation means. For example, finely divided sulfur, having a particle side preferably all of which passes through a two hundred mesh screen, is admixed with the liquid condensate comprising a mixture of triethyl phosphite and ethanol, in a proportion sufficient to provide a molar excess of sulfur to the triethyl phosphite. The reaction is exothermic and no external heat source need be provided to effect reaction. Substantially all of the ethanol can be vaporized from the reaction mixture under reduced pressure, and may be condensed and collected for use in preparing additional triethyl phosphite. The residue, which may contain unreacted sulfur, may be subjected to any conventional solid-liquid separation technique such as filtration, centrifugation and the like, to remove unreacted sulfur, and substantially pure triethyl phosphorothionate is collected as the liquid residue. If desired, the reaction of the liquid triethyl phosphite-ethanol product of the batch technique and sulfur may be effected in a column packed with sulfur.

When it is desired to prepare triethyl phosphorothionate from triethyl phosphite in accordance with the recycle technique, dispersable sulfur is added to the product vessel. A gaseous mixture of triethyl phosphite and ethanol is then conveyed from the reaction vessel distillation column through the condenser to the product vessel as a condensate where the triethyl phosphite component of the mixture reacts with the sulfur to yield triethyl phosphorothionate. This chemical reaction is effected over the temperature range between about seventy-eight degrees centigrade to about one hundred and fifty degrees centigrade at atmospheric pressure, although higher temperatures may be employed if desired. Reaction occurs readily at lower temperatures but cannot be used in the recycle technique at atmospheric pressure because the ethanol cannot be distilled from the product vessel at temperatures below seventy-eight degrees centigrade without an azeotrope-former. The ethanol is vaporized and conveyed from the product vessel distillation column to the reaction vessel. The residue from the product vessel, which contains triethyl phosphorothionate, unreacted sulfur, and ethanol may then be stripped to remove ethanol, and then subjected to a suitable solid-liquid separation technique to separate unreacted sulfur from the substantially pure triethyl phosphorothionate.

When the continuous technique is employed to prepare triethyl phosphite, sulfur is reacted with either the gaseous mixture of triethyl phosphite and ethanol or the liquid condensate comprising the mixture of triethyl phosphite and ethanol to yield triethyl phosphorothionate, as described above in connection with the reaction of sulfur with the triethyl phosphite-containing product produced in the batch process.

It is also possible to effect the reaction with sulfur in a similar manner when a reaction stream is used that is a mixture of triethyl phosphite and an ethanol-azeotrope-former, or a stream of concentrated triethyl phosphite that is essentially free of both ethanol and an ethanol-azeotrope-former. The presence of both ethanol and an ethanol-azeotrope-former is not deleterious to the chemical reaction taking place.

Other phosphites produced via the transesterification reaction of triethyl phosphite with alkyl and alkenyl alcohols as well as phenols can be reacted in a similar manner with sulfur to produce phosphorothionates and the extent of the reaction can best be illustrated by the following representative equations.

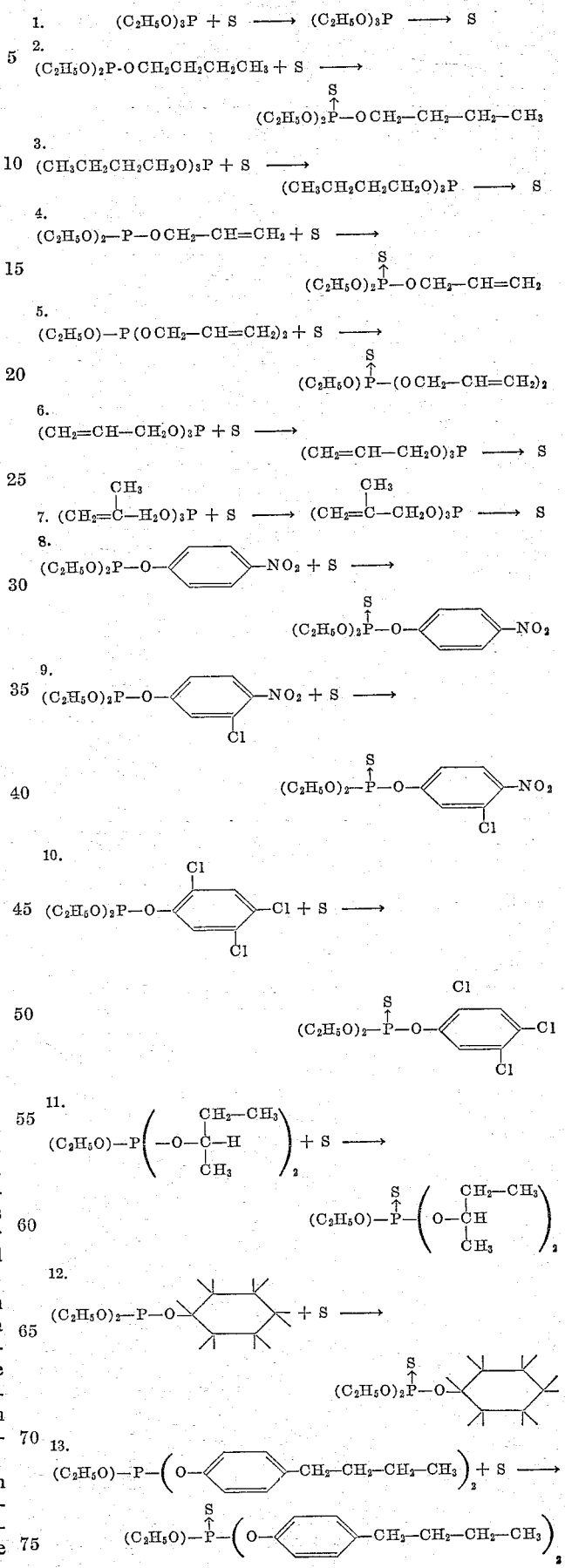

(2) REACTION WITH SELENIUM

Selenium is reacted with substantially pure triethyl phosphite, or with the triethyl phosphite-ethanol mixture or with a triethyl phosphite-ethanol-azeotrope-former, or with a mixture of triethyl phosphite, ethanol, ethanol-azeotrope-former, produced in any of the three techniques described above to yield triethyl phosphoroselenonoate, in substantially the same manner as described above with respect to the reaction of sulfur with these triethyl phosphite containing products.

In addition, other phosphites that can be readily produced from the triethyl phosphite by transesterification with other alkyl alcohols, alkenyl alcohols and phenols can be reacted in a similar manner with selenium to produce products useful in such fields as insecticides, miticides and lubricant additives. The extent of the reaction can best be shown by the following equations illustrating not only the type of phosphites attainable from transesterifying triethyl phosphite but also the phosphoroselenonoates derived therefrom.

1. $(C_2H_5O)_3P + Se \longrightarrow (C_2H_5O)_3P \longrightarrow Se$

2. 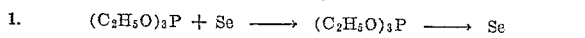

3. 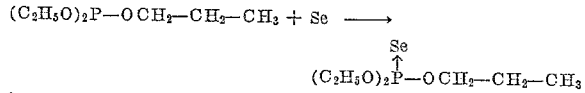

4. 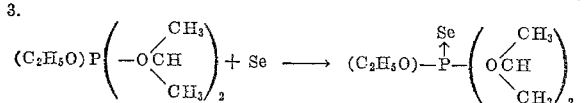

5. 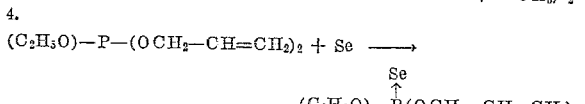

6. $(CH_2=CH-CH_2O)_3P + Se \longrightarrow (CH_2=CH-CH_2O)_3P \longrightarrow Se$ 7. 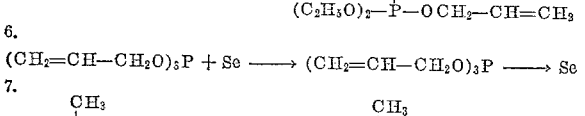

8. $(CHF_2-CF_2-CF_2CF_2CH_2O)_3P + Se \longrightarrow$
$(CHF_2-CF_2-CF_2-CF_2CH_2O)_3P \longrightarrow Se$ 9. 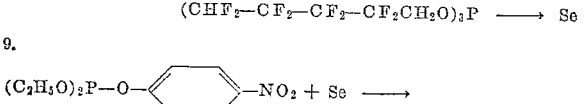

10. 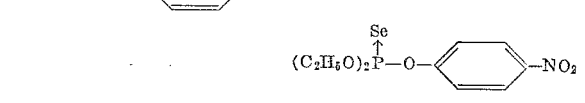

11. 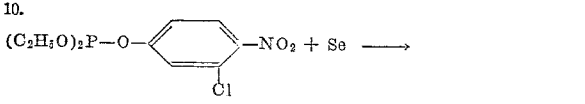

12. 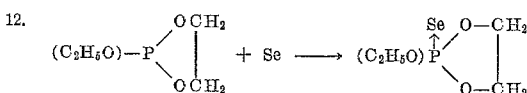

13. 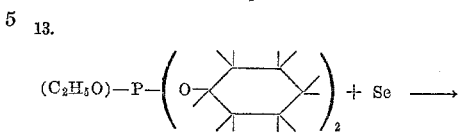

14. 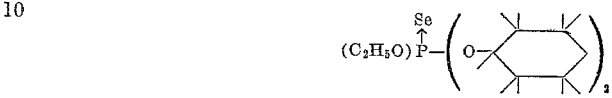

15. 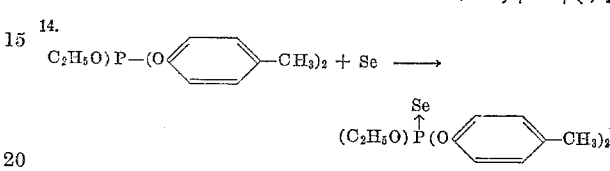

(3) REACTION WITH OXYGEN-CONTAINING COMPOUNDS

Oxidation of the triethyl phosphite to the corresponding phosphate may be effected by admixing purified triethyl phosphite, concentrated triethyl phosphite, a mixture of triethyl phosphite and ethanol, a mixture of triethyl phosphite and the azeotrope-former, a mixture of triethyl phosphite, ethanol and the ethanol azeotrope-former and mixtures thereof, produced by the batch, recycle, or continuous technique, with an oxygen-containing gas in the presence of a metal oxide catalyst. Suitable oxygen-containing gases include oxygen, air and mixtures thereof. Suitable metal oxide catalysts include aluminum oxide, vanadium pentoxide and mixtures thereof. Sufficient metal oxide is added to the phosphite to provide at least about 0.25 percent, and preferably between about two and about ten percent by weight of the phosphite. However, greater or lesser amounts of metal oxide catalyst may be added if desired. Sufficient oxygen-containing gas is reacted with the triethyl phosphite in proportions to convert substantially all of the phosphite to the corresponding phosphate. Completion of the reaction can be determined by any suitable means. The rate of addition of the oxygen-containing gas will vary with the oxygen content of the gas. For example, larger quantities of air are necessary to effect the same degree of reaction than when oxygen is employed as the gas. Any rate of addition of oxygen-containing gas that is consistent with economic operation may be employed. The oxygen-containing gas may be reacted with the triethyl phosphite by bubbling the gas through the phosphite by means of a sparging system or any other suitable liquid-gas contacting technique. The oxygen-containing gas may also react with the triethyl phosphite in the vapor state in a suitable catalyst chamber.

The temperature of the reaction in the liquid phase should be maintained between about eighty and about one hundred and eighty degrees centigrade, under atmospheric pressure. Higher temperatures up to about two hundred and twenty degrees centigrade can be used when the oxidation is conducted at superatmospheric pressure. When temperatures above about one hundred and eighty degrees centigrade are attained in the reaction mixture, isomerization of triethyl phosphite to phosphonate may occur, and the reaction may be difficult to control. Temperatures below about eighty degrees centigrade may be employed, but at these temperatures, the reaction rate is reduced.

Since the reaction mixture is substantially free of water, the danger of hydrolysis of the phosphite is lessened.

The time of reaction will depend upon the rate of addition of the oxygen-containing gas. Generally, complete conversion of the phosphite to the phosphate can be attained in as little as about eight hours, but when no catalyst is used the reaction may take more than thirty hours.

The triethyl phosphite can also be converted to triethyl phosphate by reaction with other oxidizing agents such as peroxides, hydroperoxides, nitrogen oxides, etc.

In addition, other tertiary phosphite prepared via the transesterification of triethyl phosphite can also be subjected to the discussed oxidation techniques to yield the phosphates corresponding to the starting phosphites, whose preparation from triethyl phosphite is disclosed below.

(4) ISOMERIZATION

Concentrated triethyl phosphite, purified triethyl phosphite, a mixture of triethyl phosphite and ethanol, a mixture of triethyl phosphite and ethanol-azeotrope-former, a mixture of triethyl phosphite, ethanol and ethanol-azeotropeformer, as well as mixtures thereof, derived from the transesterification of aryl-substituted phosphites by the batch, recycle or continuous technique can be caused to undergo isomerization in the presence of ethyl bromide, ethyl iodide, sodium iodide, potassium iodide, potassium bromide, etc., to yield diethyl ethylphosphonate. In instances where the source of triethyl phosphite contains ethanol the isomerization reaction occurs with a side reaction that yields as a co-product diethyl hydrogen phosphite as well as the diethyl ethylphosphonate. The separation of the two phosphorus containing products can be effected by conventional means such as fractional distillation. In addition, the diethyl hydrogen phosphite can be caused to react with other chemical intermediates, as for example, with chloral to form O,O,-diethyl-1-hydroxy-2,2,2-trichloroethylphosphonate and under such circumstances the diethyl ethylphosphonate functions as a solvent medium and is separated from the final product of the diethyl hydrogen phosphite by distillation or crystallization techniques.

In instances where substantially pure triethyl phosphite of greater than about ninety-five percent purity is available from the batch, recycle, or continuous techniques, the isomerization reaction with ethyl bromide, ethyl iodide, sodium iodide, potassium iodide, etc., is effected readily even when the catalyst concentration is as low as about 0.1 mole percent based on the triethyl phosphite. Concentrations of catalyst considerably below 0.1 percent can be used with reduced reaction rates.

The isomerization reaction proceeds at room temperature except that the rate is relatively slow. On the other hand, if the reactions are added to a heel of diethyl ethylphosphonate held at about one hundred and eighty degrees centigrade, the isomerization is complete in a matter of minutes. Stripping the reaction mixture of the catalyst and minor volatile impurities originally present in the triethyl phosphite yields a diethyl ethylphosphonate product of good color and high purity. In addition, if further purification of the diethyl ethylphosphonate is required, this can be effected conveniently by a number of conventional distillation or fractionation techniques.

As is readily apparent from the examples, the isomerization is conducted either as a batch, semi-continuous or a continuous operation and proceeds under either atmospheric or subatmospheric or superatmospheric conditions.

The triethyl phosphite produced via the techniques of the instant invention is useful as a raw material source for the preparation of mixed phosphonates, bisphosphonates, and polyphosphonates. These types of phosphonates can be produced readily by admixing molar and greater than molar amounts of an organic halide other than the ethyl halides and subjecting the mixture to reaction conditions heretofore described. Under these circumstances, ethyl halide is liberated and a carbon-phosphorus bond is established between the admixed organic halide and the phosphorous atom of the triethyl phosphite.

In instances where bis- or polyphosphonates are desired as the end products then the di- or polyhalide is admixed with about molar quantities of triethyl phosphite equivalent to the halide atoms to be replaced and is subjected to the heretofore described conditions except that temperatures up to about two hundred degrees centigrade may be employed. Ethyl halide is liberated in proportion to the number of carbon-phosphorus bonds formed.

Typical of the types of organic halides that can be used to produced mixed phosphonates, bisphonates and polyphosphonates are allyl chloride, allyl bromide, allyl iodide, methallyl chloride, methallyl bromide, methallyl iodide, 3-bromocyclohexene, 3-bromocyclopentene, chlorocyclohexane, ethylene dibromide, 1,3-dibromopropane, 1,4-dibromobutane, 1,5 - dibromopentane, 1,6 - dibromohexane, 1,6-dichlorohexane, 1,2-bis(chloromethyl) benzene, 1,3-bis(chloromethyl) benzene, 1,4-bis (chloromethyl) benzene, 1,3,5-tris(chloromethyl) benzene, butyl iodide, octyl bromide, ethyl p-toluene sulfonate, ethyl bromoacetate, β-bromoethyl ethyl ether, epibromohydrin, epichlorohydrin, cyanuric chloride, 3-chloromethyl isooxazole, 2,3-bis(bromomethyl) quinoxaline, 4-methylbenzyl bromide, 2,4-dimethylbenzyl chloride, 5,8-bis-(chloromethyl)-1,2,3,4-tetrahydronaphthalene, propargyl bromide, β-bromoethyl acetate, tetrahydrofurfuryl bromide, diiodomethane, bis(bromomethyl) ether, 1,3-dichloropropane, carbon tetrachloride, bromo acetone, chloroacetone, 2-chlorocyclopentanone, 2 - chlorocyclohexanone, 2-chloro-3-methylcyclohexanone, propionyl chloride, chloroacetonitrile, α-chloro-N,N-diethylacetamide, trichloroacetyl chloride.

(5) REACTION WITH ALCOHOLS

Triethyl phosphite available in the different states of purity and/or dilutions from the batch, recycle, and continuous techniques of the instant invention is particularly useful in the preparation of other tertiary phosphites by transesterification under basic catalysis. Other tertiary phosphites prepared from triethyl phosphite are those that can arise from the reaction of triethyl phosphite with an organic hydroxy compound having a C—C—OH group, wherein the remaining valences of the carbon atoms are satisfied by substituents selected from the group consisting of hydrogen, carbon, and mixtures thereof, such as alkyl, substituted-alkyl, cyclic, substituted-cyclic, dihydric, polyhydric, alkylidenyl and substituted alkylidenyl, alkenyl and substituted-alkenyl alcohols as well as those arising from its reaction with phenols and substituted phenols.

Although the source of triethyl phosphite can arise from the batch, recycle or continuous techniques without any deleterious effects upon the chemical transformations, surprisingly it has been found that while operating the recycle technique to produce triethyl phosphite, it is possible to prepare the other phosphites simultaneously simply by adding the proper alcohol or phenol to the product vessel of the recycle technique. In effect, this means converting the recycle technique into a double transesterification technique, namely, first the transesterification of the aryl-substituted phosphite to the triethyl phosphite, and secondly, the transesterification of the triethyl phosphite to the desired tertiary phosphite. In view of the unexpected success of this combination, it is apparent that many operating advantages accrue in being able to effect two chemical transformations in a single set of equipment, and with about the same labor requirements as had formerly been required to effect a single chemical transformation.

The double transesterification technique in principle operates in a manner similar to that previously described for the recycle technique except that means are provided to charge the other hydroxy containing material to the product vessel.

During operation, the triethyl phosphite is transesterified in the product vessel and the ethanol is recycled to the reaction vessel as before.

Once essentially all of the triethyl phosphite has been transferred via co-distillation to the product vessel from the reaction vessel, heating is discontinued on the reaction vessel and continued on the product vessel.

Ethanol is distilled from the product vessel until essentially no free ethanol exists in the product vessel.

The tertiary phosphite present in the product vessel may contain traces of ethanol and the hydroxyl material used to transesterify the triethyl phosphite and can be isolated in a high state of purity by conventional separation techniques such as distillation, fractional distillation, thermal diffusion, crystallization and liquid-liquid extraction. In many instances, it is advantageous to take the tertiary phosphite prior to purification and react it in solution with such chemical reagents as sulfur, oxygen, oxygen-containing gases, nitrogen oxides, alkyl halides, hydrogen chloride, hydrogen bromide, hydrogen iodide, selenium, etc., to produce such products as phosphates, phosphonates, secondary phosphites, phosphorothionates, phosphoroselenonoates, etc., whereupon purification is effected upon the final product. The advantages of the instant invention in producing numerous compounds of value as lubricant additives, insecticides intermediates, insecticides, chemical intermediates, plasticizers, functional fluids, stabilizers for polyvinyl chloride and other chlorine containing polymers, polyolefin polymers, etc., becomes readily apparent.

As can be seen, the present invention can be used effectively to replace one, two or three of the ethyl groups in triethyl phosphite to effect a high yield of the desired products.

Suitable hydroxyl containing materials that can be used in the instant invention include aliphatic alcohols, such as butyl, isopropyl, isobutyl, n-amyl, mixed amyl, decyl, octyl, isooctyl, hexyl, dodecyl, tridecyl, octadecyl, 2-butoxyethyl, 3-nitropropyl, 2-chloroethyl 2-bromoethyl, trifluoroethyl, 2,2,3,3-tetrafluoro propyl, 2,2,3,3,4,4,5,5-octafluoro amyl, etc. Alkenyl alcohols, such allyl, methallyl, crotyl, 3-chloroallyl, cyclic alcohols, such as cyclohexyl, 2-methylcyclohexyl, 3-methycycohexyl, cycopentyl, tetrahydrofurfuryl, furfuryl, etc. Phenols and substituted phenols such as phenol, o-nitrophenol, m-nitrophenol, p-nitrophenol, 2,4,5-trichlorophenol, o-cresol, m-cresol, p-cresol, p-chlorophenol, o-chlorophenol, 2,4-dichlorophenol, 4-nitro-5-chlorophenol, nonyl phenol, octylphenol, amyl phenol, butyl phenol, etc. These have been presented as typical and are not to be construed as limiting.

Typical of compounds containing two or more hydroxyl groups that can react with the triethyl phosphite are ethylene glycol, 1,2-propylene glycol, 1,3-propanediol, 1,4-butanediol, 2,3-butylene glycol, 1,2-butylene glycol, trimethylol propane, trimethylol ethane, dipentaerythritol, pentaerythritol, tripentaerythritol, neopentyl glycol, glycerine, 3-chloro-1,2-dihydroxy propane, 1,4-dihydroxycyclopentene, dimethylol benzene, erythritol, diethylene, glycol, triethylene glycol, dipropylene glycol, dibutylene glycol, etc.

As further definition of the type of products that can be obtained from the present invention, the following equations illustrate the types of reactions that can be effected in the product vessel.

1.
$(C_2H_5O)_3P + CH_3CH_2CH_2CH_2OH \longrightarrow$
$(C_2H_5O)_2P-OCH_2-CH_2-CH_2-CH_3 + C_2H_5OH$ 2.
$(C_2H_5O)_3P + 2CH_3CH_2CH_2CH_2OH \longrightarrow$
$(C_2H_5O)-P-(OCH_2CH_2-CH_2CH_3)_2 + 2C_2H_5OH$ 3.
$(C_2H_5O)_3P + 3CH_3CH_2CH_2CH_2OH \longrightarrow$
$P-(OCH_2CH_2CH_2CH_3)_3 + 3C_2H_5OH$

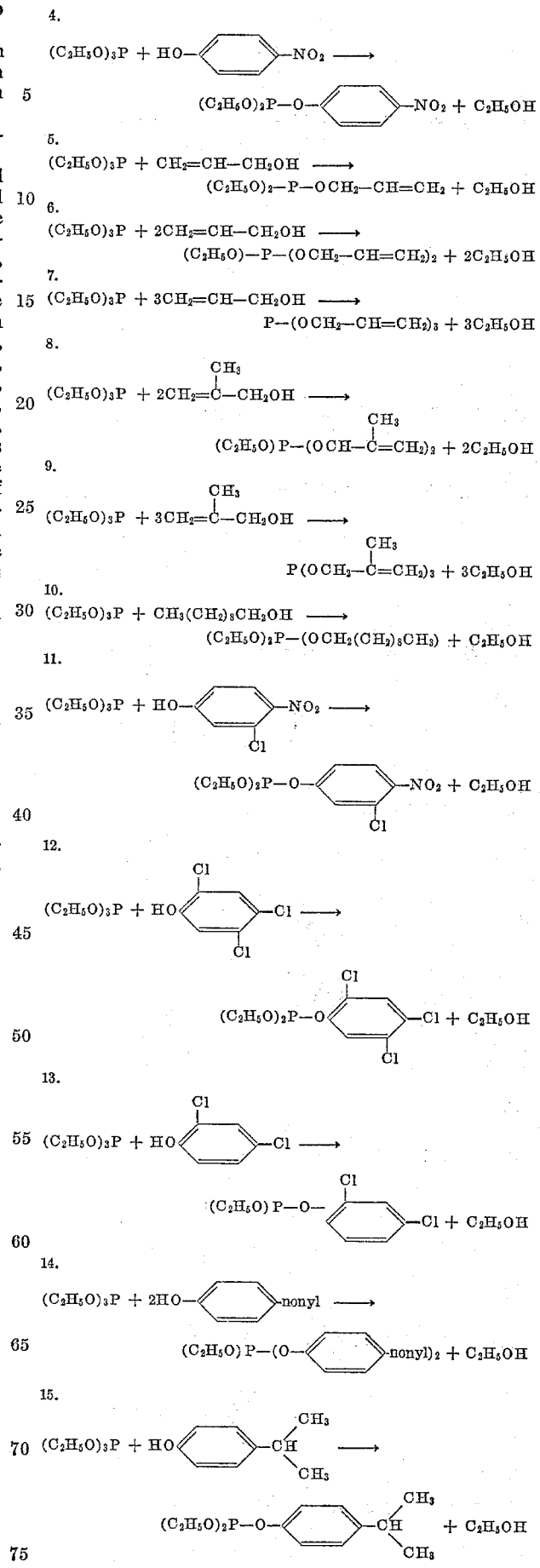

16.

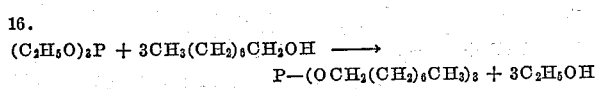

17.

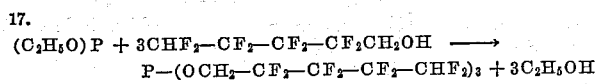

18.

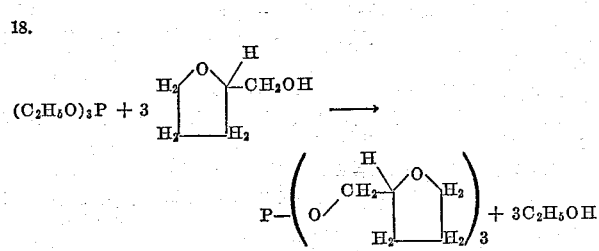

19.

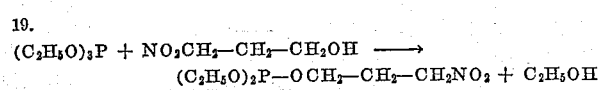

20.

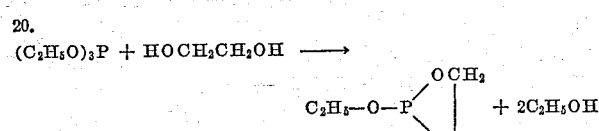

21.

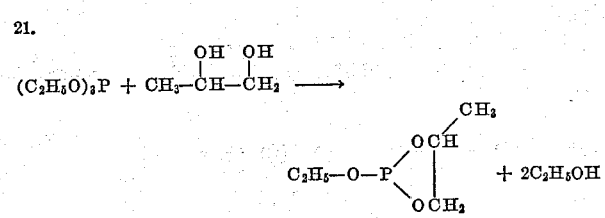

22.

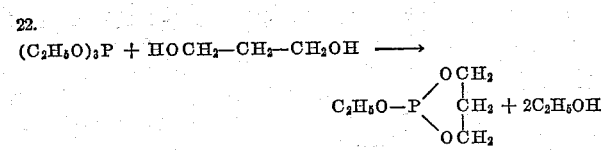

23.

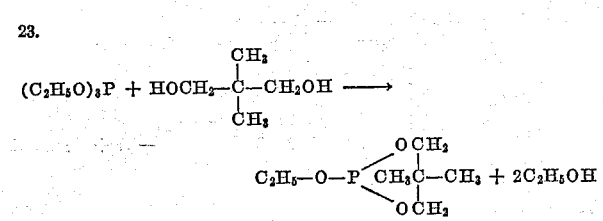

24.

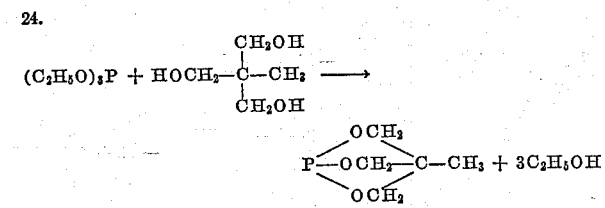

25.

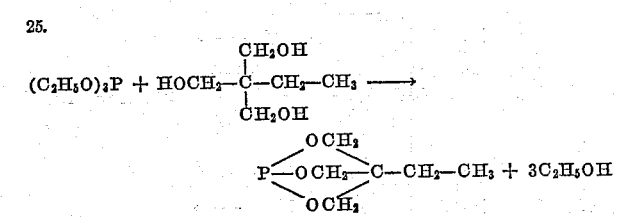

26.

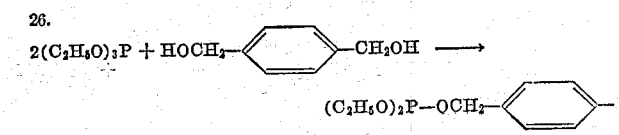

27.

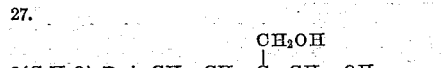

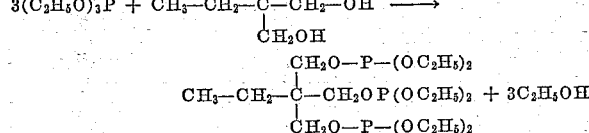

28.

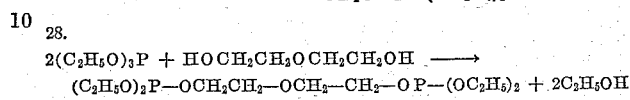

These equations are used to illustrate the typical types of transesterified products that can be produced from triethyl phosphite using the double transesterification technique in the recycle process or from triethyl phosphite streams from the batch and continuous techniques.

In addition, triethyl phosphite and tertiary phosphites produced by the double transesterification technique because of their obtention in high purity are particularly useful as reagents where addition to carbon-carbon double bonds are involved as for example in the case of unsaturated mono- and dibasic organic acids, unsaturated glycerides, unsaturated aldehydes, etc., to yield products useful as monomers, plasticizers, lubricant additives, and lubricants.

(6) HYDROLYSIS

If desired, the triethyl phosphite obtained from aryl containing phosphites by any of the aforementioned batch, recycle or continuous techniques of transesterification and present as distilled material, as a residue product or contained in solution with ethanol and/or an ethanol-azeotrope-former can be converted into diethyl hydrogen phosphite of high yield and purity. This conversion can be readily effected by adding water to the aforesaid triethyl phosphite or triethyl phosphite solutions with concomitant agitation effected by conventional means and at such a rate that the temperature is maintained in the range of about zero degrees to about eighty degrees centigrade and preferably in the range of about forty to sixty degrees centigrade, with or without cooling, depending upon the rate of water addition desired. Reaction temperatures appreciably below about zero degree centigrade may also be used but would require additional cooling which would make the process less economical and temperatures above about eighty degrees centigrade likewise may also be used, but would have attendant the increased probability of undesirable side reactions such as further hydrolysis of the desired product. The completion of the reaction is determined by the absence of tertiary phosphites (as determined by conventional means), following the addition of about a stoichiometric amount of water; when less than the stoichiometric amount of water is to be added the completion of addition is followed by agitation at the reaction temperature for a period of time of from about one-half to two hours. In the latter event, the use of less than the stoichiometric amount of water would permit the use of somewhat higher temperatures with less probability of hydrolysis of the product diethyl hydrogen phosphite than would the use of larger proportions of reactant water at these temperatures. Purification of the resulting product, diethyl hydrogen phosphite, can be effected by conventional methods of distillation, fractionation and the like. The removal of unreacted triethyl phosphite is facilitated by its co-distillation with ethanol, the latter is present as part of the original triethyl phosphite-ethanol solution and as product ethanol produced during the reaction or it is present only as product ethanol if the triethyl phosphite used was pure or in solution with other substances such as an ethanol-azeotrope-former.

The following examples are presented to define the invention more fully without any intention of being limited thereby. All parts and percentages are by weight unless otherwise specified.

Example 1

This example illustrates the batch technique for preparing triethyl phosphite. The apparatus was comprised of a three-necked, five hundred milliliter flask provided with agitation means, an addition funnel for introducing reactants and ethanol into the flask, and a packed column through which gaseous products could be removed. The upper portion of this packed column was connected to a water-cooled condenser and the discharge end of the water-cooled condenser was connected to a collection flask. Triphenyl phosphite (one hundred and fifty-four grams), ethanol (one hundred and thirty-eight grams), and sodium (one-half gram) were added to the reaction flask, and the flask and contents were heated to a temperature of about one hundred degrees centigrade, while the reactants were being agitated. With the reactants maintained at a temperature of about one hundred degrees, a total of four thousand, one hundred and ninety milliliters of ethanol (2B anhydrous) were added to the reaction flask during a period of about ten hours and forty-five minutes, and as the reaction progressed, a gaseous mixture of ethanol and triethyl phosphite passed through the packed column, was condensed in the water-cooled condenser, and collected in the product flask. Distillate was collected at one-half hour intervals and analyzed for phosphorus by the flame spectrophotometer and for phosphite by titration with standard iodine solution. About seventy-eight percent of the phosphorus initially charged through the reaction vessel as triphenyl was recovered in the product flask as triethyl phosphite; the weight ratio of ethanol to triethyl phosphite in the distillate varied from about 26:1 to about 160:1.

Example 2

The procedure of Example 1 was repeated with the exception that the temperature during the reaction period was maintained between about one hundred and twenty and about one hundred and thirty degrees centigrade. Ethanol was continuously added to the reaction vessel in the amount of about three thousand milliliters during an eight hour period. After the eight hour reaction period, about eighty percent of the phosphorus initially charged as triphenyl phosphite in the reaction vessel was recovered as triethyl phosphite in the product flask. The weight ratio of ethanol to triethyl phosphite in the distillate varied from about 12:1 to about 300:1.

Example 3

The procedure of Example 1 was repeated with the exception that the temperature of the reaction vessel was maintained between about one hundred and forty-five and about one hundred and fifty-five degrees centigrade for about three hours. Ethanol (one thousand, one hundred and forty-five milliliters) was added to the reaction vessel during this period, and about seventy-five percent of the phosphorus initially charged to the reaction vessel as triphenyl phosphate was recovered in the distillate as triethyl phosphite. The weight ratio of ethanol to triethyl phosphite in the distillate varied from about 6:1 to about 110:1.

Example 4

The procedure of Example 3 was repeated except that the aryl phosphite used was trinonylphenyl phosphite (three hundred and forty-six grams. About two thousand, five hundred and thirteen milliliters of ethanol were added during a period of about six and one-half hours, and about seventy-four percent of the phosphorus initially charged as trinonylphenyl phosphite was recovered in the distillate as triethyl phosphite. The weight ratio of ethanol to triethyl phosphite in the distillate varied from about 8:1 to about 240:1.

Example 5

The procedure of Example 3 was repeated except that the sodium added was replaced by diphenylguanidine (4.7 grams). About three thousand milliliters of ethanol were added during a period of about eight and one-half hours and about eighty percent of the phosphorus initially charged as triphenyl phosphite was recovered in the distillate as triethyl phosphite. The weight ratio of ethanol to triethyl phosphite in the distillate varied from about 16:1 to about 170:1.

Example 6

The procedure of Example 1 was followed except that the reaction flask was charged with triphenyl phosphite (fifty-two grams), triethyl phosphate (fifty-five grams), ethanol (2B anhydrous), (twenty-three grams), and sodium (one-half gram), to give a mixture having the composition of diethyl phenyl phosphite; and the reaction temperature was maintained between about one hundred and twenty-one degrees centigrade and one hundred and twenty-five degrees centigrade. About one thousand, eight hundred and fifty milliliters of ethanol were added during the period of about four and one-half hours. About ninety-six percent of the phosphorus initially charged as triphenyl phosphite was recovered in the distillate as triethyl phosphite; the weight ratio of ethanol to triethyl phosphite in the distillate varied from about 8:1 to about 230:1.

Example 7

Triethyl phosphite was prepared in this example employing the recycle technique. The apparatus of this technique was comprised of one-liter, three-necked reaction flask, having a feed inlet, an agitator, and a distillation column. The top of the distillation column was connected by means of glass tubing to a water-cooled condenser, the condenser outlet being connected to a product vessel comprised of a one-liter, three necked flask. The product vessel was also provided with an agitator and a distillation column. The top of the distillation column of the product vessel was connected to a water-cooled condenser, the water-cooled condenser being adapted to convey condensate to the feed inlet of the reaction flask. The charge to the reaction flask was comprised of tricresyl phosphite (three hundred and fifty-two grams), ethanol (two hundred and seventy-six grams), and sodium (one gram). This was equivalent to a molar ratio of ethanol to tricresyl phosphite of about 6:1. The product flask was charged with ethanol (five hundred grams).

The contents of the reaction flask were heated to a temperature of about one hundred degrees centigrade, and the contents of the product flask were heated to a temperature between about eighty degrees centigrade and these temperatures were maintained for about fifteen hours. During this time, the triethyl phosphite which formed in the reaction flask was vaporized along with ethanol, the resulting gaseous mixture was condensed in the reaction flask condenser, and the resulting condensate was conveyed to the product flask. Simultaneously, the ethanol in the product flask was vaporized, the resulting gas passed up through the product flask distillation column and was then condensed in the product flask condenser. The resulting condensate was recycled to the reaction flask. Triethyl phosphite product was collected in the product flask as it was produced during this period, while ethanol was recycled continuously. The recycle rate of ethanol was between about six and about seven milliliters per minute. At the end of the fifteen hour period distillation was stopped, and the product flask was then stripped of ethanol to a pot temperature of one hundred and thirty degrees centigrade at a pressure of seven hundred and sixty millimeters, and allowed to cool under water aspirator vacuum. The product flask residue, which predominated in triethyl phosphite, was transferred to a separate collection vessel, and the ethanol previously stripped from the product flask was condensed and returned to the product flask. The residue in the reaction flask was subjected to fractional distillation to separate an ethanol fraction and a phenol (cresol) fraction, the ultimate distillation conditions being one hundred and sixty degrees centigrade at six millimeters in the pot and eighty-four degrees centigrade in the vapor. The ethanol fraction and residue from fractional distillation were returned to the reaction flask and the phenolic fraction was stored for use in preparing additional tricresyl phosphite.

A second run was made of this recycle technique by adding to the contents of the reaction vessel tricresyl phosphite (three hundred and fifty-two grams) sodium (one gram) and sufficient ethanol to provide six moles of ethanol; by adding sufficient ethanol to the contents of the product flask to provide a total of five hundred grans of ethanol, and then repeating the procedure of the first run. This procedure was then repeated for a third and fourth run.

The conversion of phosphorus from tricresyl phosphite to triethyl phosphite in the four consecutive runs was sixty-four percent, eighty-nine percent, one hundred and four percent, and ninety-nine percent, respectively, which was equivalent to an average conversion of eighty-nine percent. The triethyl phosphite product obtained by combining the four residues from the product vessel had a purity of greater than about ninety-five percent.

*Example 8*

This example illustrates the continuous technique for preparing triethyl phosphite. The apparatus employed comprised a three-necked, five hundred milliliter flask provided with a feed inlet adapted to introduce liquid below the level of the materials to be treated in the flask, an agitator, and a packed distillation column. An outlet means was provided below the level of the material being treated in the flask to continuously remove by-products of the distillation step. The top of the distillation column was connected to a water-cooled condenser and suitable tubing means were provided for connecting the outlet ends of the condenser to a collection flask.

The reaction flask contained a transesterification mixture prepared from phenol (one hundred and ninety-five grams), triethyl phosphite (forty-eight grams), ethanol (thirty-one grams), and sodium (0.35 gram), which was heated with agitation to about one hundred and twenty-five degrees centigrade. A second transesterified mixture prepared from ethanol (two thousand, seven hundred and eighty-three grams), triphenyl phosphite (one hundred and eighty-seven grams), and sodium (one gram), was added to the reaction flask at the rate of about four hundred milliliters per hour. Simultaneously, a mixture of triethyl phosphite and ethanol distilled out of the reaction mixture and was collected in the receiver and the by-products of the distillation step overflowed from the reactor outlet and were collected in a second receiver. After some time the amount of triethyl phosphite present in the distillate collected every half hour reached a constant value (within experimental error as indicated by titration of samples with standard alcoholic iodine), and the system was considered to be at a steady state. Analysis of the distillate at steady state showed that about sixty-eight percent of the triphenyl phosphite fed into the reaction flask was recovered as triethyl phosphite in the distillate.

*Example 9*

To the reaction flask of the apparatus of Example 7 was added a charge of tricresyl phosphite (one hundred and seventy-six grams), ethanol (one hundred and thirty-eight grams), and sodium (0.5 gram). Ethanol (two hundred and fifty grams), and sulfur (eighteen grams), were added to the product flask. Both the reaction flask and the product flask were heated to maintain a rapid continuous recycling of ethanol throughout the system. After sixteen hours of recycling of ethanol the operation was discontinued. The material collected in the product flask contained triethyl phosphorothionate. This material was filtered to remove unreacted sulfur and then stripped to a pot temperature of ninety degrees centigrade at ten millimeters of mercury. The residue, which weighed 85.5 grams, was found to contain greater than ninety-five percent triethyl phosphorothionate by infrared analysis. The product yield, based upon the tricresyl phosphite originally charged to the reaction flask, was about eighty-six percent.

*Example 10*

To the recycle technique apparatus of Example 7, there was added to the reaction flask a charge of tricresyl phosphite (one hundred and seventy-six grams), ethanol (one hundred and thirty eight grams), and sodium (0.5 gram). Ethanol (two hundred and fifty grams), and powdered selenium (59.2 grams), were charged to the product flask. The contents of the reaction flask were heated to a temperature of about one hundred degrees centigrade for about fourteen hours. After this the material collected in the product flask which contained triethyl phosphoroselenonoate was then filtered to remove unreacted selenium, and then stripped to a pot temperature of about seventy-eight degrees centigrade at six millimeters of mercury to remove ethanol. The residue was then distilled at a temperature between about seventy-five and seventy-seven degrees centigrade at 1.5 millimeters of mercury to yield triethyl phosphoroselenonoate of ninety-eight percent purity and in a yield of eighty-three percent. The phosphorus analysis of the product was 13.0 percent.

*Example 11*

To the reaction flask of the recycle technique apparatus of Example 7 there was added a charge of triphenyl phosphite (one hundred and fifty-five grams), ethanol (one hundred and thirty-eight grams), and sodium (0.5 gram). The product flask of this apparatus was charged with ethanol (one hundred and fifty grams), amyl alcohol (one hundred and fifty-nine grams), and sodium (0.2 gram). The material in the reaction flask was heated to a temperature of about one hundred degrees centigrade, to maintain a rapid continuous recycling of ethanol throughout the system. After sixteen hours of recycling the heating was stopped and the mixture in the product flask was stripped to a pot temperature of one hundred and thirty degrees centigrade at seven hundred and sixty millimeters and subsequently to a temperature of one hundred and twenty degrees centigrade at four millimeters. The residue (one hundred and twenty-seven grams), which had a refractive index of 1.4361 at twenty-five degrees centigrade, contained greater than ninety-five percent triamyl phosphite and accounted for a yield of eighty-seven percent.

*Example 12*

To the reaction flask of the recycle technique apparatus of Example 7 there was added a charge of triphenyl phosphite (one hundred and fifty-five grams), ethanol (one hundred and thirty-eight grams), and sodium (0.5 gram). The product flask of this apparatus was charged with ethanol (one hundred and fifty grams), isooctyl alcohol (two hundred and twenty-two grams), and sodium (0.2 gram). The material in the reaction flask was heated to a temperature of about one hundred degrees centigrade, to maintain a rapid continuous recycling of ethanol throughout the system. After sixteen hours of recycling the heating was stopped and the mixture in the product flask was stripped to a pot temperature of one hundred and thirty degrees centigrade at seven hundred and sixty millimeters, and subsequently to a temperature of one hundred and twenty degrees centigrade at four millimeters. The residue (one hundred and ninety-one grams), which had a refractive index of 1.4480 at twenty-five degrees centigrade was equivalent to a yield of tri-isooctyl phosphite of ninety-one percent.

*Example 13*

To the reaction flask of the recycle technique apparatus of Example 7 there was added a charge of triphenyl phosphite (one hundred and fifty-five grams), ethanol (one hundred and thirty-eight grams), and sodium (0.5 gram). The product flask of this apparatus was charged with ethanol (one hundred and fifty grams), methallyl alcohol (one hundred and thirty grams), and sodium (0.2 gram). The material in the reaction flask was heated to a temperature of about one hundred degrees centigrade, to maintain a rapid continuous recycling of ethanol throughout the system. After sixteen hours of recycling the heating was stopped and the mixture in the product flask was stripped to a pot temperature of one hundred and thirty degrees centigrade at seven hundred and sixty millimeters and subsequently to a temperature of one hundred and four degrees centigrade at four millimeters. The residue (77.4 grams), was equivalent to a yield of trimethallyl phosphite of sixty-four percent.

*Example 14*

To the reaction flask of the recycle technique apparatus of Example 7 there was added a charge of triphenyl phosphite (one hundred and fifty-five grams), ethanol (one hundred and thirty-eight grams), and sodium (0.5 gram). The product flask of this apparatus was charged with ethanol (one hundred and fifty grams), allyl alcohol (one hundred and four grams), and sodium (0.2 gram). The material in the reaction flask was heated to a temperature of about one hundred degrees centigrade, to maintain a rapid continuous recycling of ethanol throughout the system. After twenty-six hours of recycling the heating was stopped and the mixture in the product flask was stripped to a pot temperature of one hundred and thirty degrees centigrade at seven hundred and sixty millimeters. The residue (89.1 grams), was equivalent to a yield of triallyl phosphite of eighty-nine percent.

*Example 15*

Triethyl phosphite (83.1 grams), prepared as in Example 1, butyl alcohol (148.2 grams), and metallic sodium (0.5 gram), were placed in a five hundred milliliter, three-necked flask. The flask was provided with a thermometer, and a Vigreux column having a K-head and a water cooled condenser. The reactants were heated to reflux and stripped to a pot temperature of one hundred and fifty degrees centigrade, and a vapor temperature of one hundred and fourteen degrees centigrade. The liquid residue was cooled and water aspirator vacuum was applied to remove the last traces of ethanol. The residue, after filtering, weighed one hundred and sixteen grams, which was equivalent to a conversion of ninety-three percent, and had a refractive index at 25.5 degrees centigrade of 1.4296. Infrared analysis of the residue indicated it to be tributyl phosphite of greater than ninety-five percent purity.

*Example 16*

Triethyl phosphite (one hundred and sixty-six grams), prepared as in Example 1, butyl cellosolve (four hundred and seventy-two grams), and metallic sodium (0.5 gram), were added to a one-liter, three-necked flask, provided with a thermometer and a distillation column having a K-head and a water cooled condenser. The reactants were heated to reflux and maintained at reflux for about one and one-half hours. The reaction was stripped to a pot temperature of one hundred and eighty-four degrees centigrade and a vapor temperature of one hundred and thirty-four degrees centigrade. A final stripping was made at a pot temperature of one hundred and sixty-five degrees centigrade at nine millimeters of mercury to remove excess butyl cellosolve. The liquid residue, by infrared analysis was tris(2-butoxyethyl) phosphite of greater than ninety-five percent purity. The residue had a refractive index at 24.5 degrees centigrade of 1.4402, and weighed three hundred and fifty-three grams, which was equivalent to a conversion of ninety-four percent.

*Example 17*

The apparatus employed in this example was a two hundred and fifty milliliter, three-necked flask, provided with a condenser, a thermometer, a heating mantle and a stirrer. Oxygen was pumped through a line equipped with a rotameter which communicated with a gas dispenser positioned in the bottom of the flask. Fifty grams of triallyl phosphite prepared as in Example 14, and two grams aluminum oxide were added to the flask. Oxygen was fed through the gas dispenser while agitating the flask contents at a rate of about ninety milliliters per minute. The temperature during the reaction was maintained at about one hundred and ten degrees centigrade. After two hours of reaction the residue was filtered to remove the catalyst, and the filtrate, by infrared analysis, was found to contain greater than about ninety-five percent triallyl phosphite. The refractive index of the triallyl phosphate at twenty-two degrees centigrade was 1.4495.

*Example 18*

Triethyl phosphite (166.0 grams) was cooled to between about minus ten to zero degrees centigrade, purged with nitrogen and then treated with dry hydrogen chloride until 39.5 grams (1.1 moles) was absorbed. The addition required one hundred minutes. The solution was then stirred for thirty minutes and stripped of ethyl chloride and any residual hydrogen chloride present under vacuum, while maintaining the temperature during this period at between about minus ten to zero degrees centigrade. Finally, the mixture was stripped to twenty-five degrees centigrade at thirty millimeters of mercury. The residue weighed one hundred and forty-two grams, had a refractive index at twenty-five degrees centigrade of 1.4090, and analyzed eighty-five percent diethyl phosphite. Distillation of the residue at seventy-four degrees centigrade and ten millimeters mercury gave one hundred and sixteen grams of diethyl phosphite (refractive index at twenty-five degrees centigrade of 1.4061), having a purity of greater than about ninety-five percent, and accounted for a yield of eighty-four percent.

*Example 19*

Water (20.7 grams) was added in small portions to triethyl phosphite (one hundred and sixty-six grams) over a period of two hours. Reaction temperatures of twenty-five to fifty-four degrees centigrade were maintained by the exothermic reaction. The ethanol produced was distilled at one hundred and forty millimeters to a pot temperature of one hundred degrees centigrade. The residue (138.9 grams, $N_D^{25}$ 1.4059), contained greater than ninety-five percent diethyl phosphite by infrared analysis and accounted for a yield of greater than ninety-five percent.

*Example 20*

Diethyl ethylphosphonate was prepared by adding triethyl phosphite (thirty-four grams), and ethyl iodide (1.6 grams), to a five hundred milliliter, round bottomed flask equipped with a mechanical stirrer, an addition funnel, a thermometer, and a condenser leading to a Dry Ice trap, and heated with agitation to reflux (about one hundred and thirty-six degrees centigrade). During a period of about two hours and ten minutes the temperature rose to 197.5 degrees centigrade at which time a sample was removed which gave essentially a negative test for phosphite with a solution of iodine in benzene.

At this time, a mixture of triethyl phosphite (one hundred and sixty-nine grams) and ethyl iodide (eight grams) was placed in the addition funnel and was added to the stirred diethyl ethylphosphonate at such a rate that, with moderate heating, the temperature of the mixture remained at one hundred and seventy-five to one hundred and eighty degrees centigrade; addition took about one hour. The mixture was heated with stirring to one hundred and eighty-eight degrees centigrade for an additional fifty minutes. A sample removed at this time did not decolorize one drop of a solution of iodine in benzene. The material was then heated at total reflux to a temperature of seventy-eight degrees centigrade at a pressure of eight millimeters of mercury to remove ethyl iodide; essentially all the ethyl iodide originally charged was thus removed and collected in a Dry Ice trap. Analysis of a sample of the remaining mixture showed it to be essentially pure diethyl ethylphosphonate (by analysis of its infrared spectrum), and to contain 18.4 percent phosphorus (flame spectrophotometer). $C_6H_{15}O_3P$ requires 18.7 percent phosphorus. The yield of phosphonate at this point was essentially quantitative (ninety-eight percent). Distillation of this material (less the seven grams removed for sampling) gave 192.5 grams material having a refractive index of 1.4145–1.4146 at twenty-six degrees centigrade, in a yield of greater than ninety-eight percent.

*Example 21*

Diethyl ethylphosphonate was also prepared by the isomerization of triethyl phosphite in a pressure vessel. A steel pressure cylinder of about three hundred milliliter internal volume and equipped with a relief valve and a pressure gage was immersed to about one-quarter its length in an oil bath. Triethyl phosphite (twenty grams), ethyl idodide (1.8 gram), and ethanol (2B anhydrous, forty grams), was added to the cylinder which was then sealed. The oil bath was heated to about one hundred and forty to one hundred and sixty degrees centigrade, and maintained at this temperature for about two and one-half hours during which time the gage registered pressures of fifty to seventy-five p.s.i.g. After cooling the bomb, the contents were removed and distilled at reduced pressure to give, in addition to recovered ethyl iodide and ethanol, a fraction having a boiling point range of forty-nine to seventy-one degrees centigrade at seven millimeters pressure, a refractive index of 1.4119 at twenty-five degrees centigrade, and containing 19.4 percent phosphorus (flame spectrophotometer). Analysis of its infrared spectrum showed that it consisted of recovered triethyl phosphite, diethyl hydrogen phosphite and diethyl ethylphosphonate. A second fraction was also obtained weighing 11.5 grams, having a refractive index of 1.4139 at twenty-five degrees centigrade and 18.6 percent phosphorus (flame spectrophotometer). Its infrared spectrum showed that it consisted of about eighty percent diethyl ethylphosphonate and fifteen percent diethyl hydrogen phosphite.

*Example 22*

To the reaction flask of the apparatus of Example 7 was added a charge of triphenyl phosphite (one hundred and fifty-five grams), ethanol (one hundred and thirty-eight grams), and phosphorous acid (one gram). Ethanol (two hundred and fifty grams) was added to the product flask. Both the reaction flask and the product flask were heated to maintain a rapid continuous recycling of ethanol throughout the system. The body temperature of the reaction flask was held at one hundred degrees centigrade and after sixteen hours of recycling of ethanol there remained in the product flask two hundred and eighty-nine grams of a mixture that contained about 11.0 percent of triethyl phosphite. This represented a conversion of triphenyl phosphite and co-distillation of triethyl phosphite from the reaction vessel of about thirty-nine percent of the theoretical yield of triethyl phosphite.

*Example 23*

The procedure of Example 1 was repeated with the exception that the trimethyl phosphite mixture was obtained by the reaction of three moles of ethanol with phosphorus trichloride in the presence of an excess of triethylamine and ethanol. The reaction flask then theoretically contained triethyl phosphite (one hundred and sixty-six grams), triethylamine hydrochloride (three hundred and eighty-five grams) ethanol (six hundred grams), and triethylamine (twenty grams). With the temperature of the liquid in the reaction flask held at eighty-five degrees centigrade a total of fifty-four hundred milliliters of ethanol was added to the reaction flask over a period of 13.5 hours. A co-distillate of ethanol and triethyl phosphite equal to four thousand, one hundred and sixty-four grams was obtained. This co-distillate contained about 63.4 percent of the theoretically available triethyl phosphite.

*Example 24*

Employing the recycle apparatus of Example 7, triphenyl phosphite (one hundred and fifty-five grams), ethanol (one hundred and thirty-eight grams), and sodium (0.5 gram), were added to the reaction flask, and ethanol (one hundred and twenty-five grams), and methylcyclohexane (one hundred and twenty-five grams) were added to the product flask. The contents of the reaction flask were heated to a pot temperature of one hundred degrees centigrade, and the contents of the product flask were heated to the boiling temperature, and these conditions were maintained for about sixteen hours. During this time, there was a continuous recycling of the ethanol-methylcyclohexane mixture from the product flask to the reaction flask at the rate of about 8.5 milliliters per minute. After sixteen hours the reaction flask contained two hundred and seventy-eight grams and the product flask contained two hundred and twenty-four grams. About forty-three percent of the phosphorus initially charged as triphenyl phosphite was recovered as triethyl phosphite in the product flask.

It will be recognized by those skilled in the art that various modifications within the invention are possible, some of which have been referred to above. Therefore, we do not wish to be limited except as defined by the appended claims.

We claim:

1. The process which comprises admixing ethanol with a reaction mixture comprising triethyl phosphite contaminated with its reactants and by-products from which it was made, and distilling from the reaction mixture a vapor phase containing triethyl phosphite and ethanol.

2. The process for recovering triethyl phosphite which comprises admixing ethanol with a mixture containing triethyl phosphite and a phenol, and distilling from the resulting mixture a vapor phase containing triethyl phosphite and ethanol.

3. The process of claim 2 wherein said vapor phase containing triethyl phosphite and ethanol is admixed with an ethanol azeotrope-former, the resulting mixture of ethanol, ethanol azeotrope-former, and triethyl phosphite is distilled to yield a vapor phase containing ethanol and ethanol azeotrope-former, and substantially pure triethyl phosphite is recovered as the distillation residue.

4. The process of claim 3 wherein said ethanol azeotrope-former is selected from the group consisting of benzene, toluene, octanes, hexanes, cyclohexane, acetonitrile, ethyl nitrate, methyl borate, thiophene, cyclopentane, methylcyclopentane, 2,2,4 - trimethylpentane, dipropyl ether methylcyclopentene and methylcyclohexane.

5. The process for recovering triethyl phosphite which comprises admixing ethanol with an aryl-substituted phosphite to yield a transesterification mixture containing triethyl phosphite, admixing ethanol with said transesterification mixture, and distilling from the resulting mixture a vapor phase containing triethyl phosphite and ethanol.

6. The process of claim 5 wherein said aryl-substituted phosphite is selected from the group consisting of aryl diethyl phosphites, diaryl ethyl phosphites, triaryl phosphites, and mixtures thereof.

7. The process of claim 5 wherein said ethanol is admixed with said aryl-substituted phosphite in the presence of a basic catalyst to yield said transesterification mixture.

8. The process of claim 7 wherein said basic catalyst is selected from the group consisting of potassium hydride, lithium hydride, sodium borohydride, lithium aluminum hydride, sodium sulfide, sodium hydroxide, lithium sulfide, potassium sulfide, sodium methylate, potassium phenolate, butyl lithium, phenyl sodium, aluminum isopropoxide, diethyl aniline, sodium cetylates, sodium octadecylates, quinoline, monododecyl monomethyl amine, pyridine, monododecyl dimethyl amine, sodium ethylate, sodium phenolate, potassium ethylate, didodecylmonomethylamine and lithium ethylate.

9. The process of claim 5 wherein the proportion of said ethanol admixed with said transesterification mixture is equivalent to a weight ratio of ethanol to triethyl phosphite in the transesterification mixture of between about 0.2:1 and about 250:1.

10. The process of recovering triethyl phosphite which comprises admixing ethanol, an aryl-substituted phosphite, and a small but effective amount of a basic catalyst to yield a transesterification mixture containing triethyl phosphite and a phenol, the proportion of ethanol added being sufficient to co-distill with triethyl phosphite present in the transesterification mixture under the distillation conditions thereafter employed, distilling said transesterification mixture to yield a vapor phase containing triethyl phosphite and ethanol, continuously adding ethanol to the transesterification mixture as distillation progresses, collecting said vapor phase, and continuing said distillation, said ethanol addition, and said collection until substantially all of said triethyl phosphite has been separated from the transesterification mixture.

11. The process of claim 10 wherein the proportion of said basic catalyst is equivalent to between about 0.001 and about 0.2 mole per mole of said aryl-substituted phosphite.

12. The process of claim 10 wherein said basic catalyst is selected from the group consisting of potassium hydride, lithium hydride, sodium borohydride, lithium aluminum hydride, sodium sulfide, sodium hydroxide, lithium sulfide, potassium sulfide, sodium methylate, potassium phenolate, butyl lithium, phenyl sodium, aluminum isopropoxide, diethyl aniline, sodium cetylates, sodium octadecylates, quinoline, monododecyl monomethyl amine, pyridine, monododecyl dimethyl amine, sodium ethylate, sodium phenolate, potassium ethylate, didodecylmonomethylamine and lithium ethylate.

13. The process of claim 10 wherein said vapor phase containing triethyl phosphite and ethanol is contacted with sulfur to yield triethyl phosphorothionate, and a vapor phase predominating in ethanol.

14. The process of claim 10 wherein said vapor phase containing triethyl phosphite and ethanol is admixed with an ethanol azeotrope-former, the resulting mixture is then distilled to yield a vapor phase containing ethanol and ethanol azeotrope-former, and a liquid phase predominating in triethyl phosphite.

15. The process of claim 14 wherein said ethanol azeotrope-former is selected from the group consisting of benzene, toluene, octanes, hexanes, cyclohexane, acetonitrile, ethyl nitrate, methyl borate, thiophene, cyclopentane, methylcyclopentane, 2,2,4 - trimethylpentane, dipropyl ether methylcyclopentene, and methylcyclohexane.

16. The process of claim 14 wherein the liquid phase predominating in triethyl phosphite is contacted with an oxygen-containing gas in the presence of a metal catalyst selected from the group consisting of aluminum oxide, vanadium pentoxide, and mixtures thereof, and the resulting triethyl phosphate is recovered.

17. The process of claim 14 wherein said liquid phase predominating in triethyl phosphite is reacted with a compound selected from the group consisting of monohydric alcohol, polyhydric alcohol, and a phenol, each of which may contain halogen, nitro and other inert substituents, in the presence of a small effective amount of a basic catalyst to yield a corresponding tertiary phosphite.

18. The process for recovering triethyl phosphite which comprises admixing ethanol, an aryl-substituted phosphite, and a small but effective amount of a basic catalyst, heating the mixture to a temperature of between about 100 and 130 degrees centigrade, to yield a transesterification mixture containing triethyl phosphite and a phenol, the proportion of ethanol added being sufficient to transesterify said aryl-substituted phosphite and to co-distill with the triethyl phosphite present in the transesterification mixture under the distillation conditions thereafter employed, distilling said transesterification mixture to yield a vapor phase containing triethyl phosphite and ethanol, distilling said vapor phase to yield an ethanol vapor phase depleted in triethyl phosphite and a liquid phase of triethyl phosphite depleted in ethanol, recycling said ethanol vapor phase to said transesterification mixture, continuing the distillation of said transesterification mixture and the recycling of said ethanol vapor phase until substantially all of the triethyl phosphite has been separated from the transesterification mixture, and recovering a liquid phase containing triethyl phosphite.

19. The process of claim 18 wherein the proportion of said basic catalyst is equivalent to between about 0.001 and about 0.2 mole per mole of said aryl-substituted phosphite.

20. The process of claim 18 wherein said basic catalyst is selected from the group consisting of potassium hydride, lithium hydride, sodium borohydride, lithium aluminum hydride, sodium sulfide, sodium hydroxide, lithium sulfide, potassium sulfide, sodium methylate, potassium phenolate, butyl lithium, phenyl sodium, aluminum isopropoxide, diethyl aniline, sodium cetylates, sodium octadecylates, quinoline, monododecyl monomethyl amine, pyridine, monododecyl dimethyl amine, sodium ethylate, sodium phenolate, potassium ethylate, didodecylmonomethyl amine and lithium ethylate.

21. The process of claim 18 wherein the proportion of ethanol added to the transesterification mixture to effect co-distillation with the triethyl phosphite is equivalent to a weight ratio of ethanol to triethyl phosphite of between about 0.2:1 and about 250:1.

22. The process of claim 18 wherein said vapor phase containing triethyl phosphite and ethanol is contacted with an ethanol azeotrope-former, the resulting mixture is distilled to yield a liquid phase containing triethyl phosphite and a vapor phase containing a mixture of ethanol and the ethanol azeotrope-former, and the vapor phase is recycled to the transesterification mixture.

23. The process of claim 22 wherein said azeotrope-former is selected from the group consisting of benzene, toluene, octanes, hexanes, cyclohexane, acetonitrile, ethyl nitrate, methyl borate, thiophene, cyclopentane, methylcyclopentane, 2,2,4-trimethylpentane, dipropyl ether methylcyclopentene and methylcyclohexane.

24. The process of claim 18 wherein said liquid phase containing triethyl phosphite is reacted with a compound selected from the group consisting of monohydric alcohol, polyhydric alcohol, and a phenol, each of which may contain halogen, nitro and other inert substituents, in the presence of a catalytic proportion of a basic catalyst to yield a corresponding tertiary phosphite.

25. The process of claim 24 wherein said compound is allyl alcohol, and said tertiary phosphite is triallyl phosphite.

26. The process of claim 18 wherein said liquid phase containing triethyl phosphite is reacted with an ethyl halide to yield diethyl ethylphosphonate and diethyl hydrogen phosphite.

27. The continuous process for recovering triethyl phosphite which comprises admixing ethanol, an aryl-substituted phosphite and a small but effective amount of a basic catalyst to yield a transesterification mixture containing triethyl phosphite, ethanol and a phenol, the proportion of ethanol added being sufficient to transesterify said aryl-substituted phosphite and to co-distill with triethyl phosphite present in the transesterification mixture under the distillation conditions thereafter employed, continuously feeding said transesterification mixture to a distillation zone whereby a vapor phase containing triethyl phosphite and ethanol is continuously formed and removed, and a portion of the liquid phase predominating in the phenolic by-products of the transesterification reaction is continuously removed from the distillation zone.

28. The process of claim 27 wherein said basic catalyst is selected from the group consisting of potassium hydride, lithium hydride, sodium borohydride, lithium aluminum hydride, sodium sulfide, sodium hydroxide, lithium sulfide, potassium sulfide, sodium methylate, potassium phenolate, butyl lithium, phenyl sodium, aluminum isopropoxide, diethyl aniline, sodium cetylates, sodium octadecylates, quinoline, monododecyl monomethyl amine, pyridine, monododecyl dimethyl amine, sodium ethylate, sodium phenolate, potassium ethylate, didodecylmonomethyl amine and lithium ethylate.

29. The process of claim 27 wherein the proportion of ethanol added to the transesterification mixture to effect co-distillation with the triethyl phosphite is equivalent to a weight ratio of ethanol to triethyl phosphite of between about 0.2:1 and about 250:1.

30. The process of claim 27 wherein the triethyl phosphite and ethanol are continuously contacted with selenium, whereby the triethyl phosphite component reacts with selenium to yield triethyl phosphoroselenonoate, and said triethyl phosphoroselenonoate is continuously separated.

31. The process of claim 30 wherein the condensate of ethanol and ethanol azeotrope-former is recycled to said transesterification mixture.

32. The continuous process for recovering triethyl phosphite which comprises admixing ethanol, an aryl-substituted phosphite and a small but effective amount of a basic catalyst to yield a transesterification mixture containing triethyl phosphite, ethanol and a phenol, the proportion of ethanol added being sufficient to transesterify said aryl-substituted phosphite and to co-distill with triethyl phosphite present in the transesterification mixture under the distillation conditions thereafter employed, continuously feeding said transesterification mixture to a first distillation zone whereby a vapor phase containing triethyl phosphite and ethanol is continuously formed and removed, condensing said vapor phase, collecting the resulting condensate, continuously distilling the resulting condensate in a second distillation zone to yield an ethanol vapor phase depleted in triethyl phosphite and a liquid phase of triethyl phosphite depleted in ethanol, continuously recycling said ethanol vapor phase to said first distillation zone, continuously collecting a portion of said liquid phase of triethyl phosphite and ethanol, and continuously removing from the first distillation zone a portion of the liquid phase predominating in the phenolic by-products of the transesterification reaction.

33. The process which comprises admixing the co-distillate of the reaction mixture comprising triethyl phosphite contaminated with its reactants and by-products from which it was made with said reaction mixture, and distilling from the reaction mixture a vapor phase containing triethyl phosphite and said co-distillate agent.

34. The process of preparing derivatives of triethyl phosphite which comprises admixing ethanol, an aryl-substituted phosphite, and a small but effective amount of a basic catalyst to yield a transesterification mixture containing triethyl phosphite and a phenol, the proportion of ethanol added being sufficient to co-distill with triethyl phosphite present in the transesterification mixture under the distillation conditions thereafter employed, distilling said transesterification mixture to yield a vapor phase containing triethyl phosphite and ethanol, and continuously contacting said vapor phase containing triethyl phosphite and ethanol with an inorganic reactant material selected from the group consisting of sulfur, and selenium to yield a compound selected from the group consisting of triethyl phosphorothionate and triethyl phosphoroselenonoate, respectively, and a vapor phase predominating in ethanol.

35. The continuous process for recovering derivatives of triethyl phosphite which comprises admixing ethanol, an aryl-substituted phosphite and a small but effective amount of a basic catalyst to yield a transesterification mixture containing triethyl phosphite, ethanol and a phenol, the proportion of ethanol being sufficient to transesterify said aryl-substituted phosphite and to co-distill with triethyl phosphite present in transesterification mixture under the distillation conditions thereafter employed, continuously feeding said transesterification mixture to a distillation zone whereby a vapor phase containing triethyl phosphite and ethanol is continuously formed and removed, and a portion of the liquid phase predominating in the phenolic by-products of the transesterification reaction is continuously removed from the distillation zone, and continuously contacting the triethyl phosphite and ethanol vapors with an inorganic reactant material selected from the group consisting of sulfur, selenium and oxygen whereby the triethyl phosphite component reacts with the inorganic reactant to form triethyl phosphorothionate, triethylphosphoroselenonoate and triethyl phosphate, respectively, separating a vapor phase predominating in ethanol, and recovering triethyl phosphorothionate, triethyl phosphoroselenonoate and triethyl phosphate, respectively.

References Cited in the file of this patent

UNITED STATES PATENTS 2,970,166   Rosin et al. _____ Jan. 31, 1961

OTHER REFERENCES

Kosolapoff, "Organo-Phosphorus Compounds" (1950), John Wiley & Sons, Inc., New York, N.Y., pp. 121, 235–236.

Fox et al., "The Chemistry of Organo-Phosphorus Compounds," NRL Report C–3323, p. 62 (1948).

Razumov et al., "Bull. Acad. Sci. U.S.S.R., Div. Chem Soc." (1952), pp. 797–802 (English trans.).